(12) United States Patent
Turner et al.

(10) Patent No.: US 7,769,752 B1
(45) Date of Patent: Aug. 3, 2010

(54) METHOD AND SYSTEM FOR UPDATING DISPLAY OF A HIERARCHY OF CATEGORIES FOR A DOCUMENT REPOSITORY

(75) Inventors: Michael Turner, Mountain View, CA (US); Philippa Horne, Berkeley, CA (US); Doug Mendoza, Sunnyvale, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 714 days.

(21) Appl. No.: 10/867,873

(22) Filed: Jun. 14, 2004

Related U.S. Application Data

(60) Provisional application No. 60/567,203, filed on Apr. 30, 2004.

(51) Int. Cl.
*G06F 7/00* (2006.01)
(52) U.S. Cl. .................... 707/731; 707/705; 707/740
(58) Field of Classification Search .............. 707/5
See application file for complete search history.

(56) References Cited

U.S. PATENT DOCUMENTS

| | | | |
|---|---|---|---|
| 5,826,258 A | | 10/1998 | Gupta |
| 5,918,236 A | * | 6/1999 | Wical .................... 715/209 |
| 5,933,827 A | * | 8/1999 | Cole et al. .................... 707/10 |
| 5,978,766 A | | 11/1999 | Luciw |
| 6,029,172 A | * | 2/2000 | Jorna et al. ................. 707/102 |
| 6,098,066 A | * | 8/2000 | Snow et al. .................... 707/3 |
| 6,366,910 B1 | * | 4/2002 | Rajaraman et al. ............. 707/5 |
| 6,418,429 B1 | | 7/2002 | Borovoy |
| 6,567,797 B1 | | 5/2003 | Schuetze |
| 6,571,243 B2 | | 5/2003 | Gupta |
| 6,574,620 B2 | | 6/2003 | Borovoy |
| 6,598,054 B2 | | 7/2003 | Schuetze |
| 6,609,122 B1 | | 8/2003 | Ensor |
| 6,868,525 B1 | * | 3/2005 | Szabo ........................ 715/738 |
| 2002/0052894 A1 | * | 5/2002 | Bourdoncle et al. ......... 707/513 |
| 2002/0087599 A1 | * | 7/2002 | Grant et al. ................. 707/513 |
| 2003/0069878 A1 | * | 4/2003 | Wise ............................. 707/3 |
| 2005/0144162 A1 | * | 6/2005 | Liang ............................ 707/3 |

OTHER PUBLICATIONS http://en.wikipedia.org/wiki/Venn_diagrams.*
Weisstein, Eric W. "Venn Diagram." From MathWorld—A Wolfram Web Resource. http://mathworld.wolfram.com/VennDiagram.html.*
Weisstein, Eric W. "Venn Diagram." From MathWorld—A Wolfram Web Resource. <http://mathworld.wolfram.com/VennDiagram.html>.*

* cited by examiner

*Primary Examiner*—Tim T. Vo
*Assistant Examiner*—Aaron Sanders
(74) *Attorney, Agent, or Firm*—Blakely, Sokoloff, Taylor & Zafman LLP

(57) ABSTRACT

A method and system for browsing a document repository are described. According to one embodiment of the invention, one or more hierarchies of categories are generated. For each category in each hierarchy, a search query is generated and assigned to the respective category. The search queries are executed against documents in a document repository and, based on the results of the search queries, a category-to-documents mapping table is updated to indicate the documents that are associated with each category. The categories for which there are associated documents are displayed to a user via a visual interface. As the user selects one or more categories to browse, the hierarchical categories displayed to the user are automatically and dynamically updated to reflect the number of documents associated with the category, based on the user's category selection.

35 Claims, 9 Drawing Sheets

US 7,769,752 B1

METHOD AND SYSTEM FOR UPDATING DISPLAY OF A HIERARCHY OF CATEGORIES FOR A DOCUMENT REPOSITORY

RELATED APPLICATIONS

The present application claims the benefit of the filing date of U.S. provisional patent application Ser. No. 60/567,203, filed Apr. 30, 2004, which is incorporated herein by reference.

FIELD OF THE INVENTION

The present invention relates generally to information retrieval. More particularly, the present invention relates to a method and system for browsing documents stored in a document repository.

BACKGROUND OF THE INVENTION

As the amount of electronically stored data (e.g., computer files such as documents) in data repositories continues to grow, so too does the importance of tools that allow people to find and access such data. Traditionally, two distinct types of tools have been utilized in content retrieval systems. One type of tool that has traditionally been employed in content retrieval systems is commonly referred to as a keyword search tool or search engine. The second type of tool often utilized in content retrieval systems is commonly known as a browser or browsing tool.

To perform a search using a keyword search engine, a user (e.g., a searcher) generally inputs one or more keywords that the search engine uses in a query executed against the content. Typically, the user is presented with the title of each document that contains one or all of the keywords input by the user. In a structured search engine, the user may be able to specify the particular part of the document to search, for example, the title or body of the document. However, because keyword searches often have a significantly large number of results, often the search engine only displays a list of those documents that are deemed most relevant, based on some predetermined relevance ranking scheme. For example, the relevance of documents may be ranked based on the number of keyword "hits" in a particular document.

Content retrieval systems that utilize keyword searches are problematic for a variety of reasons. One problem is that keyword searches often result in far too many results. For example, because documents are returned if a keyword is found anywhere in the document, a significant number of documents are returned to the user that have no relevance to the topic or area of interest to the user. Another problem with keyword searches is that in order to be effective the user must be familiar with the content being searched. In particular, the user must be familiar with the particular vocabulary of the content and have a relatively high level of proficiency with the language of the content. This is particularly problematic when the user has a native language that is different than the language of the content and/or when the content being searched is highly technical in nature and has a relatively limited vocabulary that is specific to the technical area to which the content relates. Additionally, because many search engines do not employ linguistic databases, the user is required to input keywords exactly as they appear in the document. For example, if a document contains a different form of a keyword that is input by a user, or if a keyword is misspelled as input by the user, a document "hit" will not result. Finally, if there is a significant amount of content and the content is not well structured to facilitate searching, the search may take a significant amount of time to perform.

Content repositories that offer a browsing capability typically allow the user to browse content that has been categorized or organized into a tree-like, hierarchical structure, similar to the directory structure on a typical personal computer. The user is generally presented with one or more top-level categories, from which the user selects the category that seems most relevant to the topic or area of interest to the user. As the tree is traversed from top to bottom, the categories typically increase in their level of specificity or detail.

While browser tools solve some of the aforementioned problems associated with search engine tools, browser tools are also problematic for a variety of reasons. One problem with browser tools is that the user is generally forced to take a linear path down a single branch of the tree that leads the user deeper and deeper into the hierarchical structure. If the user cannot find relevant content after traversing a particular path, the user is forced to traverse backwards, up the tree-like structure, often resulting in a frustrating and time-consuming search experience for the user.

Additionally, content repositories that utilize browser tools generally require significantly more work to setup and maintain because the content must be categorized or organized into the tree-like structure. In particular, content managers face the often-difficult challenge of determining where to place each document within the hierarchical structure. Because many documents contain content of interest to different people for different reasons, documents often must be placed within more than one category of the hierarchical structure. Consequently, when the document requires updating, the content manager must locate and update multiple copies of the document—an inefficient and potentially error-prone process.

SUMMARY OF THE INVENTION

The present invention includes a method and system for browsing documents. In accordance with the method, a user interface is presented to a user. The user interface displays a hierarchy of user-selectable categories. Each category has an associated search query. Based on categories selected by the user, the categories displayed to the user are dynamically updated to display only those categories for which documents in a document repository are available.

Other aspects of the present invention will be apparent from the accompanying figures and from the detailed description that follows.

BRIEF DESCRIPTION OF THE DRAWINGS

The present invention is illustrated by way of example, and not by way of limitation, in the figures of the accompanying drawings, in which like references indicate similar elements, and in which.

DETAILED DESCRIPTION

Figure 1:
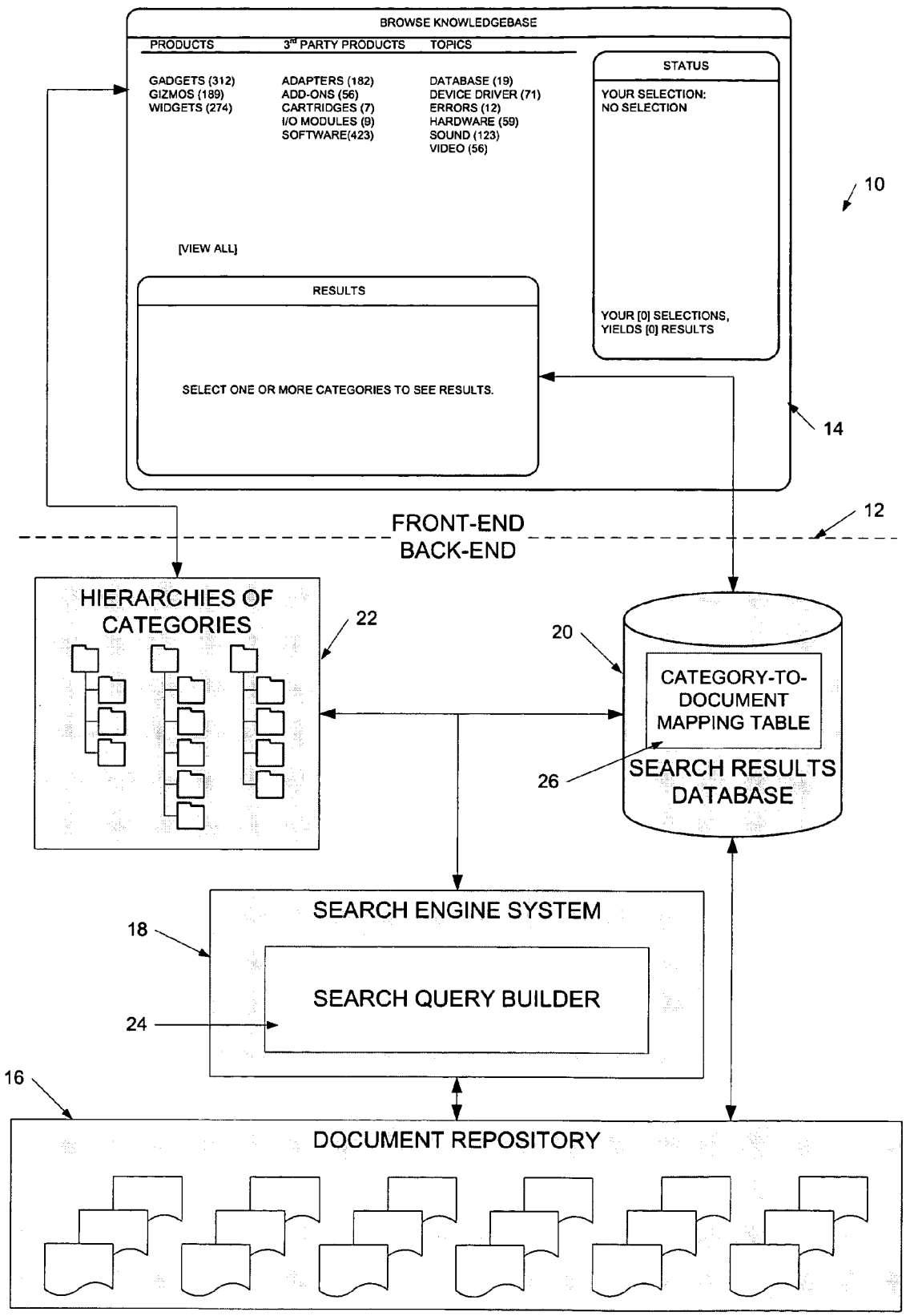
FIG. 1 is a block diagram for one embodiment of a system for facilitating information retrieval with the combined functionality of search and browse tools.

A method and system for browsing documents are described. In the following description, for purposes of explanation, numerous specific details are set forth in order to provide a thorough understanding of the present invention. It will be evident, however, to one skilled in the art that the present invention may be practiced without these specific details.

The present invention may find use in many practical applications. One particular application for which the present invention is particularly well suited is an online, user-searchable knowledgebase. An online knowledgebase is a centralized location for storing files and/or documents that can be accessed by customers in need of support. For example, via an online knowledgebase, a customer may locate and access product manuals for a particular product, technical help files such as "how-to" articles, software patches for fixing or updating software applications, and demonstration or beta versions of software applications. Although the present invention is described in the particular context of a user-searchable knowledgebase in the following description, it will be appreciated that the invention has many other practical applications. For example, the present invention might be used to browse for compatible parts in a parts inventory, or to browse for system information by selecting different options in a system configuration guide.

According to one aspect of the present invention, a user is presented with a user interface having a display of hierarchical categories that are user-selectable. Each category is associated with a search query that determines which documents in a document repository are assigned to the particular category based on a search string. Each time a user selects a particular category via the user interface, the visual display of hierarchical categories is automatically and dynamically updated based on the user's category selection. In addition, the user interface displays a visual depiction of the set of documents satisfying the search queries associated with all categories selected by the user.

The present invention is advantageous over prior search and browse tools for several reasons. One advantage of the present invention is that it provides a user with a simple and easy to use interface for browsing a large document repository with technically complex content. In contrast to traditional browsing tools that require the user, through trial and error, to linearly traverse a tree-like directory structure in a top-to-bottom manner, a method of browsing consistent with the present invention provides a user with the ability to enter the structure at any point, and to select multiple categories or paths through the structure. With each selection, the hierarchical categories presented to the user are dynamically updated based on the user's category selections, thereby eliminating the possibility that the user will select a category with no associated documents. Other advantages will be apparent from the detailed description that follows.

FIG. 1 illustrates a block diagram for one embodiment of a system 10 for facilitating information retrieval with the combined functionality of a search engine and a browsing tool. As illustrated by the horizontal dotted line 12 in FIG. 1, the system includes both a front-end and back-end portion. The front-end portion of the system 10 includes a user interface 14 that allows a user to interact with the system. For one embodiment of the invention, the system may be implemented in a typical client-server environment such that the front-end portion coincides with a client and the back-end portion coincides with a server. For example, the user interface 14 of the front-end may be functionally integrated to operate in conjunction with a standard web-browser application. Similarly, the components comprising the back-end may be functionally integrated with one or more Internet server applications, such as a web server (not shown). However, it will be appreciated that in alternative embodiments, the system may be implemented as a stand-alone application, or in an environment other than a client-server environment.

In addition to the user interface 14, the other primary components of the system include a document repository 16, a search engine system 18, a search results database 20, and one or more hierarchies of categories 22. For one embodiment of the present invention, the search engine system 18, the document repository 16, the search results database 20, and the hierarchy of categories all reside on the same computing device. However, it will be appreciated that in alternative embodiments of the invention, each of the aforementioned components, or combinations thereof, may reside on separate computing devices that are interconnected via network connections.

For purposes of the present invention, a document may include any electronically stored information entity capable of being searched, including but not limited to: audio files, data files, graphics files, picture files, text files, and/or video files. For one embodiment of the invention, the document repository 16 is a centralized location where data is stored and maintained. The document depository may be implemented as a database, a file system, or some other structured data system. The document repository may be a place where multiple databases or files are located for distribution over a network, or alternatively, the document repository may be a location that is directly accessible to the user.

For one embodiment of the invention, an administrator of the system defines a hierarchy of categories 22 to which the content in the document repository 16 relates. For example, the particular number of individual hierarchies, the depth level of each hierarchy, and the number of sub-categories within a particular hierarchy will generally be dependent upon the content of the documents and the level of search detail desired by the administrator of the system 10. The hierarchies 22 may be generated and maintained in a variety of ways. For example, for one embodiment of the invention, a text editor may be used to generate a text file for defining the hierarchies. A numbering system may be used to identify the relationship between the different categories. For example, a category associated with the number "3.2" may be in the second level of hierarchy number three. In an alternative embodiment, the hierarchies may be associated with a file system of an operating system. For example, the hierarchies may simply be defined by generating directories within the file system of the operating system. In yet another embodiment, the hierarchical categories may be created in a database. For one embodiment of the system, the search engine system 18 may include an administrative interface including an editing tool to create and manage the hierarchical categories. Once the hierarchies of categories 22 have been defined and generated, a search query is generated for each category in each hierarchy.

For one embodiment of the invention, the search engine system 18 includes an automatic search query builder 24 that may be used to automatically generate search queries for each category of each hierarchy 22 based on the name of each category. In addition, the search query builder 24 may use a linguistic database (not shown) to expand search queries to use alternative word forms for certain words. For example, the search string for the category name "software license" may be automatically generated to include "software licensing." For one embodiment of the invention, search queries are created using a standard query language.

Figure 2:
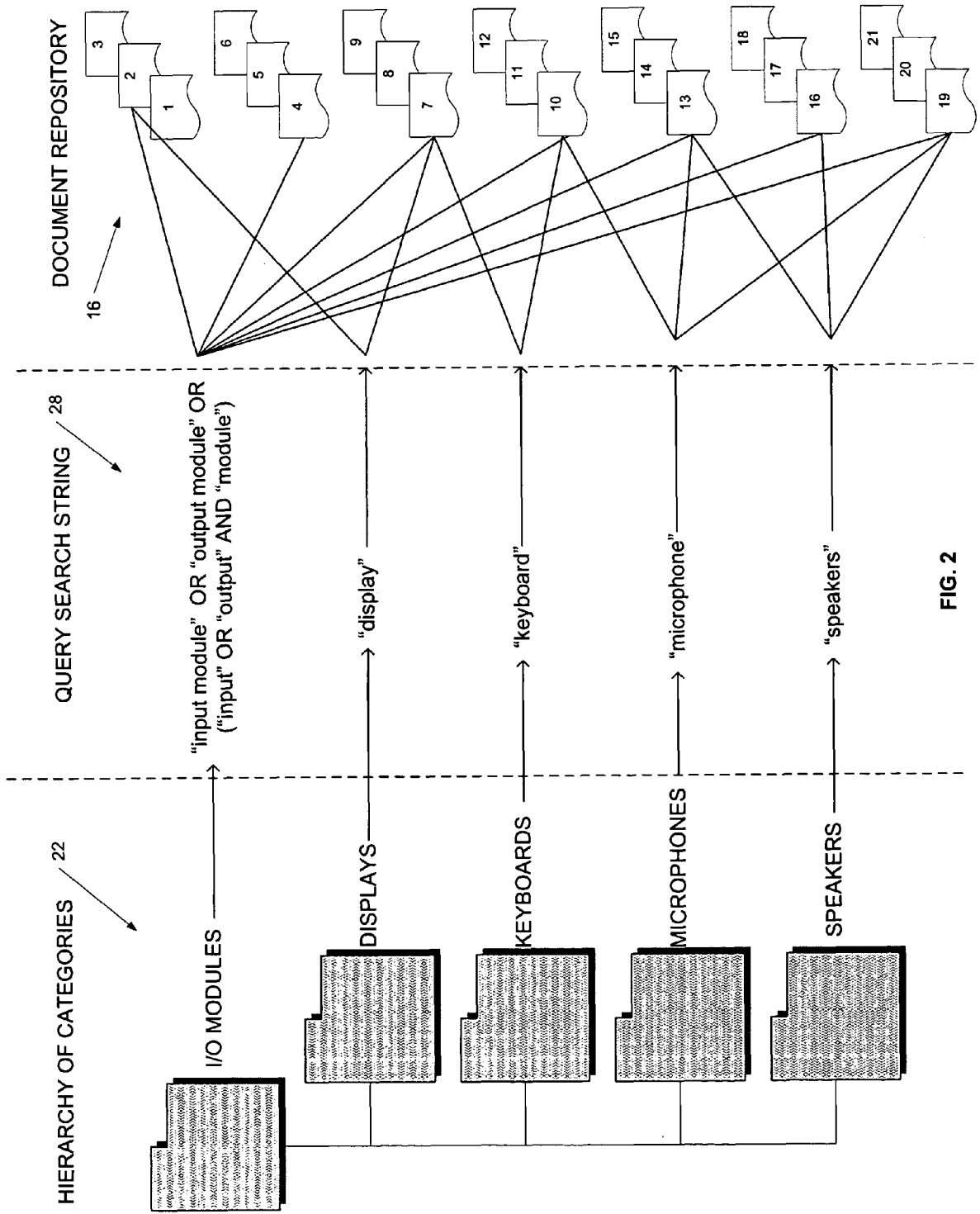
FIG. 2 illustrates, for one embodiment of the invention, the relationship between a hierarchy of categories, a query search string, and documents within a document repository.

FIG. 2 illustrates, for one embodiment of the invention, the relationship between a hierarchy of categories 22, a search string 28 used in a search query, and documents within a document repository 16. The hierarchy of categories 22 illustrated in FIG. 2 includes only two levels—the top-level, with the single category "I/O Modules" and, the next level, having four categories: "Displays," "Keyboards," "Microphones," and "Speakers." For purposes of the present invention, the term "category" refers to all categories, including top-level categories as well as sub-categories. A top-level category is the highest-level category for a hierarchy, and a sub-category is any category that falls underneath a top-level category. Any number of levels may be used, however, for one embodiment of the invention, the hierarchies are purposefully designed to be shallow (e.g., one or two levels deep) to limit the frustration and time associated with traversing the wrong path.

The search string 28 of the search query defines whether a particular document within the document repository 16 is related to a particular category. For example, for one embodiment of the invention, the search string may be the name of the category. In certain applications, such as a user-searchable knowledgebase having content with a highly technical but limited vocabulary, selecting the search string based on the category name may be advantageous. For example, if the search string for each category is based on the category name, as opposed to some subjectively selected term based on a conceptual relationship, then the user is more likely to find documents with relevant content when selecting a particular category.

As illustrated in FIG. 2, the search string associated with the search query assigned to the category "Keyboards" is simply the string, "keyboards." For one embodiment of the invention, the search engine system 18 automatically generates search strings for each category based on the category name. In addition, the search strings 28 may be manually edited to fine tune the results of a given search query. Furthermore, as illustrated in FIG. 2, the search engine system 18 may utilize a linguistic database to generate more robust search strings for a particular category name. For example, the search query builder 24 may expand a search string for the category "I/O Modules" to include: input module, output module, input modules, output modules, and (input OR output AND module). Generating the search string based on the category name will generally result in a desired level of detail, however, for some broad categories, particularly top-level categories, greater precision may be required.

Figure 3:
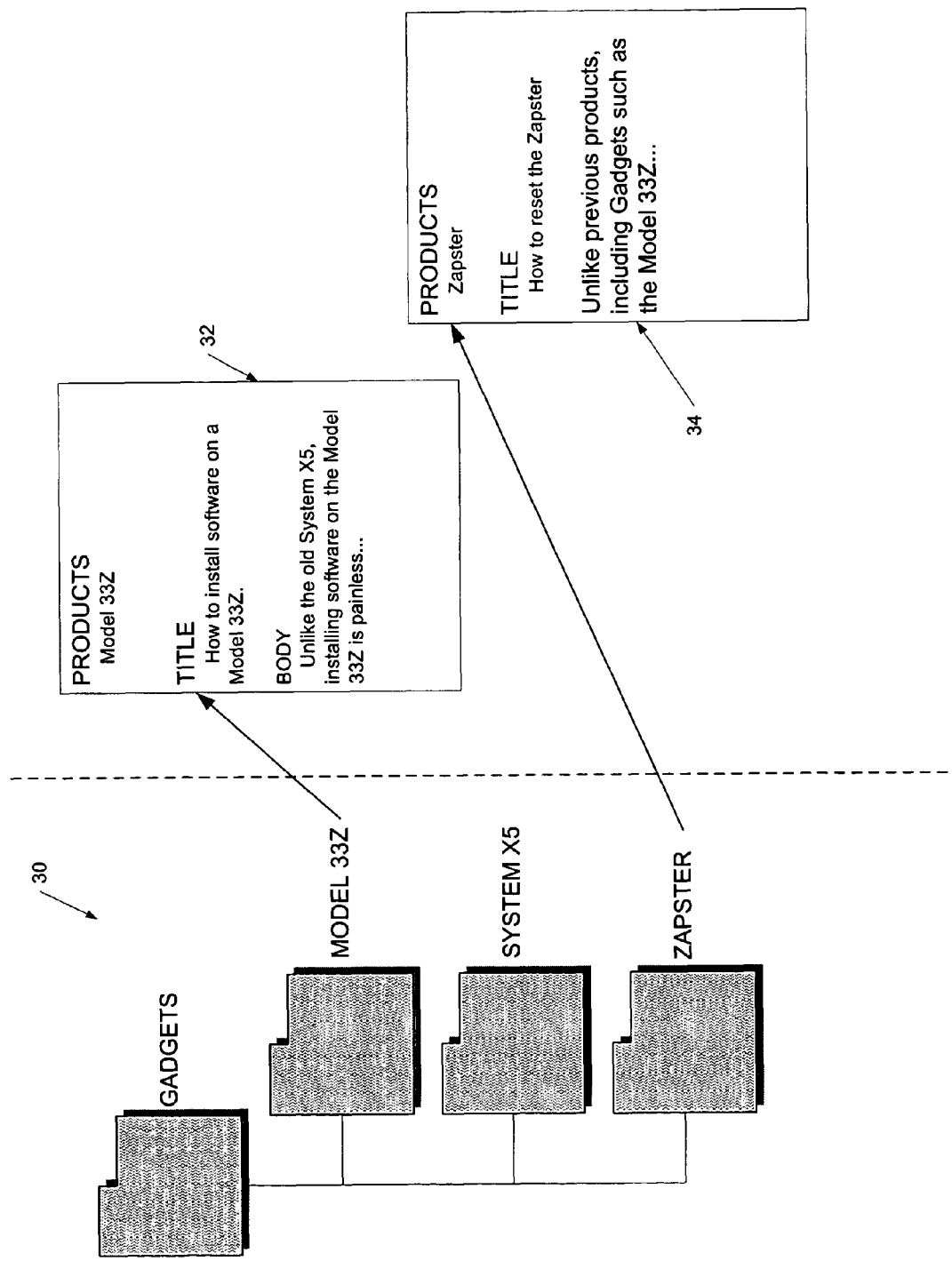
FIG. 3 illustrates, for one embodiment of the invention, the relationship between high-level categories and document properties.

FIG. 3 illustrates, for one embodiment of the invention, the relationship between high-level categories 30 and document properties. For one embodiment of the invention, search queries for high-level categories are designed to search particular portions or attributes of each document. For example, each document may be structured in such a way that it has certain searchable attributes, or properties, such as a title, product field, or topic field. The fields or attributes may be part of the document that is visible to the user, or alternatively, the field may consist of meta data. By structuring search queries for high-level categories to target certain attributes of the document, fewer documents that include the search string in an improper context will be returned. Take, for example, a document 32 that relates primarily to a product with the name "Model 33Z" and the document 32 includes "Model 33Z" in its title, but makes a single reference to a product with the name "System X5" in the body of the document. If the document is structured such that the title is searchable, and the search query focuses on the title and excludes the body, then the document will be appropriately categorized within the "Model 33Z" category, and not the "System X5" category. Similarly, a searchable product field or attribute, such as that illustrated in document 34, provides a mechanism for achieving greater precision when searching.

One particularly advantageous aspect of the present invention is that the search queries are executed prior to displaying the user-selectable categories to a user via the user interface 14. Referring again to FIG. 1, for one embodiment of the invention, the search engine system 18 executes the search query for each category against the document repository 16 and then updates a search results database 20 based on the result of each search query. The search results database contains a category-to-document mapping table 26 that maps the relationship between each category of each hierarchy to all of the documents in the document depository 16. If, for example, there are no documents that are associated with a particular category because the search query associated with the category did not return any documents, then that particular category will not be presented to the user via the user interface 14. Displaying the user-selectable, hierarchical categories to the user after the search has been performed eliminates the possibility that a user will select a category for which there are no associated documents. In addition, because the search associated with each category has been executed before the presentation of the hierarchies to the user via the user interface, the number of documents associated with each category can be displayed in addition to the category. This gives the user an idea of how much content there is related to a particular category without selecting the category via the user interface.

For one embodiment of the invention, documents are continuously being added and/or removed from the document repository 16. In addition, documents are continuously being revised and amended. Consequently, the search query for each category may be run at a particular interval to keep the search results database current and up to date. For one embodiment of the invention, the search queries are executed nightly to limit the amount of network traffic that may interfere with the normal use of the system 10.

Figure 4:
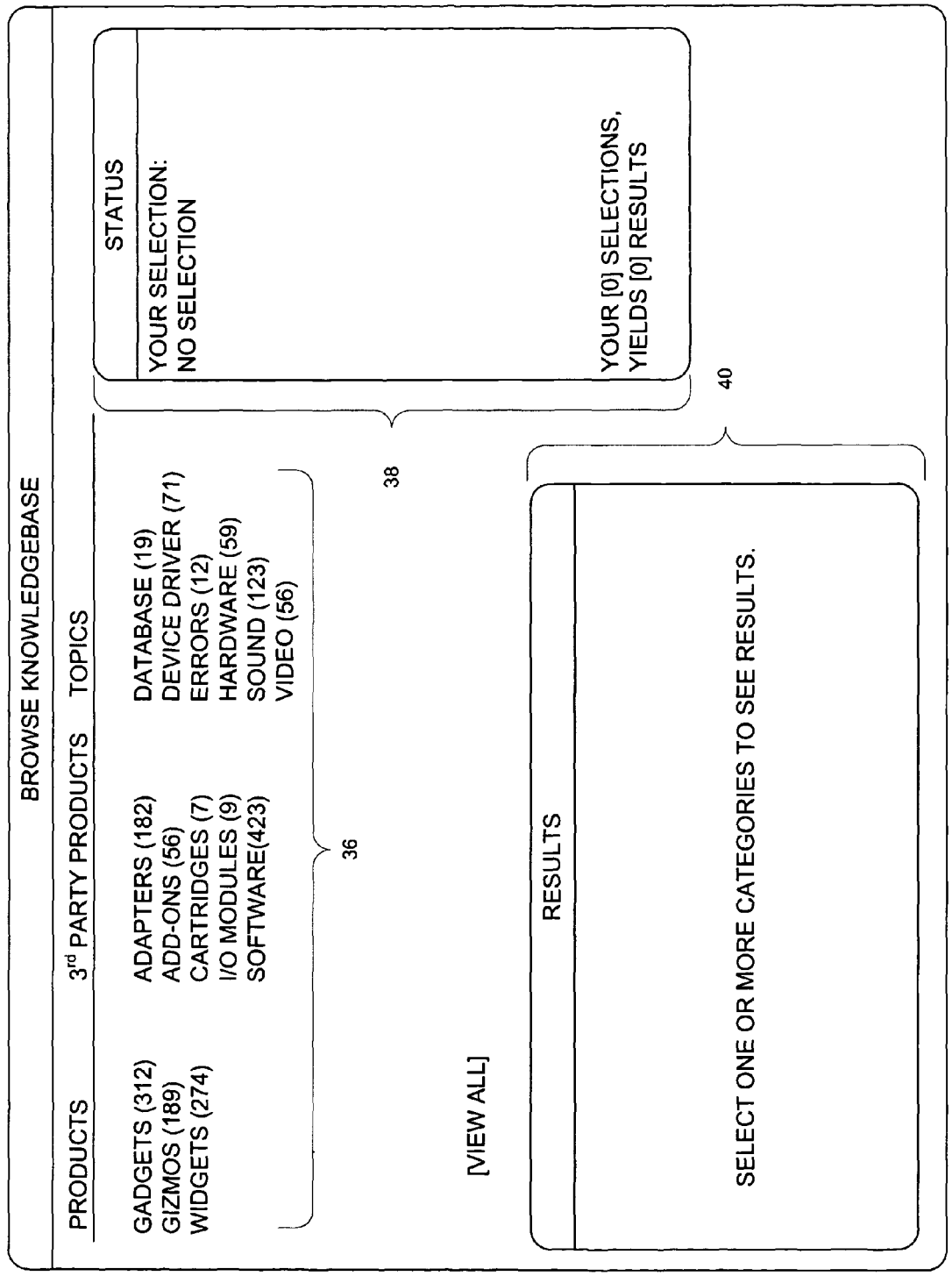
FIGS. 4, 5, 6, and 7 illustrate a user interface consistent with one embodiment of a system for browsing documents.

FIGS. 4, 5, 6, and 7 illustrate a user interface consistent with one embodiment of a system for browsing documents. The user interface 14 illustrated in FIG. 4 is representative of a user interface for a searchable knowledgebase. As illustrated in FIG. 4, for one embodiment of the invention, the user interface 14 has three main components: a display of user-selectable categories 36, a visual status indicator 38, and a search results window 40. For one embodiment of the invention, the top-level category for each hierarchy is further categorized and placed into one of several master categories. For example, in FIG. 4 the top-level categories GADGETS, GIZMOS, and WIDGETS are alphabetically listed under the master category PRODUCTS. Next to each top-level category, a number in parentheses indicates the number of documents that are available for the associated top-level category. For example, in FIG. 4, there are 312 documents that satisfy the query associated with the category GADGETS.

For one embodiment of the invention, the user may be presented with a button or link to view all categories in the hierarchy. For example, as illustrated in FIG. 4, the user may select the "[SHOW ALL]" button or link to view all the categories available for selection. This feature is particularly advantageous because it provides the user with the capability of selecting any sub-category in any of the hierarchies presented. Consequently, in direct contrast to most hierarchical-based browsing tools, the user can perform a bottom-up search by selecting a low-level category first. For example, rather than traversing deep into one path of the directory structure via a trial and error process, the user is free to select multiple entry points into the hierarchical structure, including entering the structure by initially selecting low-level sub-categories.

Figure 5:
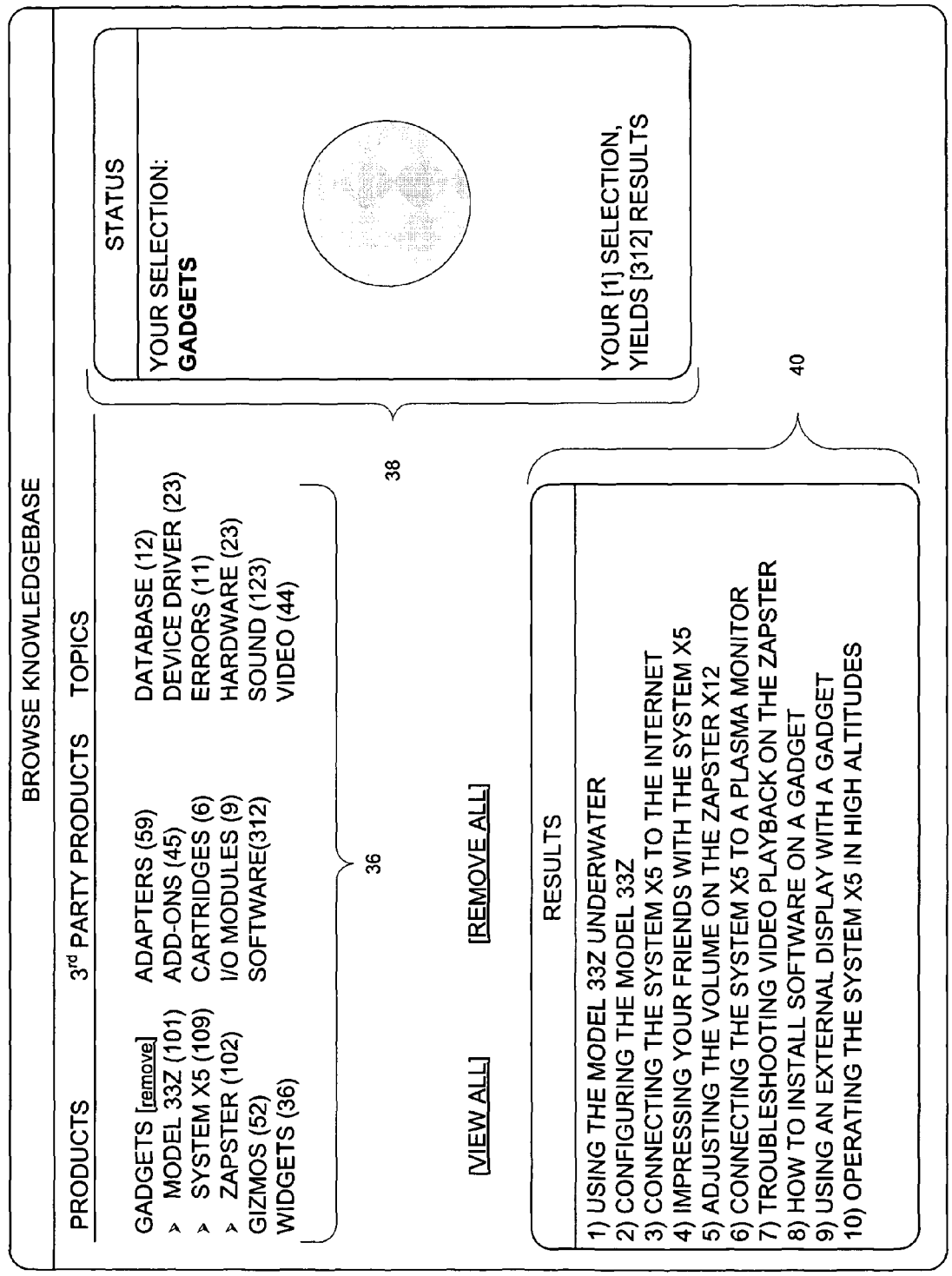

As illustrated in FIG. 5, when a user makes a category selection, the hierarchical categories are dynamically updated. For example, the user interface 14 illustrated in FIG. 5, shows the result of a user selecting the category GADGETS. When the user selects GADGETS, the subcategories for GADGETS are displayed underneath the category name for GADGETS. In addition, for each category, the number of documents that satisfy the category are updated to reflect the user's category selection. For example, when the user selects the category GADGET, the number of documents for the category DATABASE changes from "(19)" to "(12)" reflecting the number of documents that satisfy the query of the particular category (e.g., DATABASE) and the query of the user's category selection (e.g., GADGETS).

In addition, when the user selects the category GADGETS, the visual status indicator 38 shows a Venn diagram representing the set of all documents that satisfy the query associated with the user's category selection. For example, underneath the circle illustrated in the visual status indicator 38, the number of documents satisfying the user's single category selection is shown (e.g., 312 results for 1 category selection). Furthermore, the search results window 40 displays the 10 most relevant documents for the particular category selected. For one embodiment of the invention, the documents are selected for display, and ordered, in the search results window based on a relevance-ranking algorithm. For example, for one embodiment, the documents that are most frequently accessed may be displayed. Alternatively, the documents with the most matches of the particular search string associated with the search query of the selected category may be displayed. At any time the user may select a document from the search results window by simply selecting the title of the document. For one embodiment of the invention, a button or link may be presented that allows the user to view a listing of all of the search results for the user's category selections.

Figure 6:
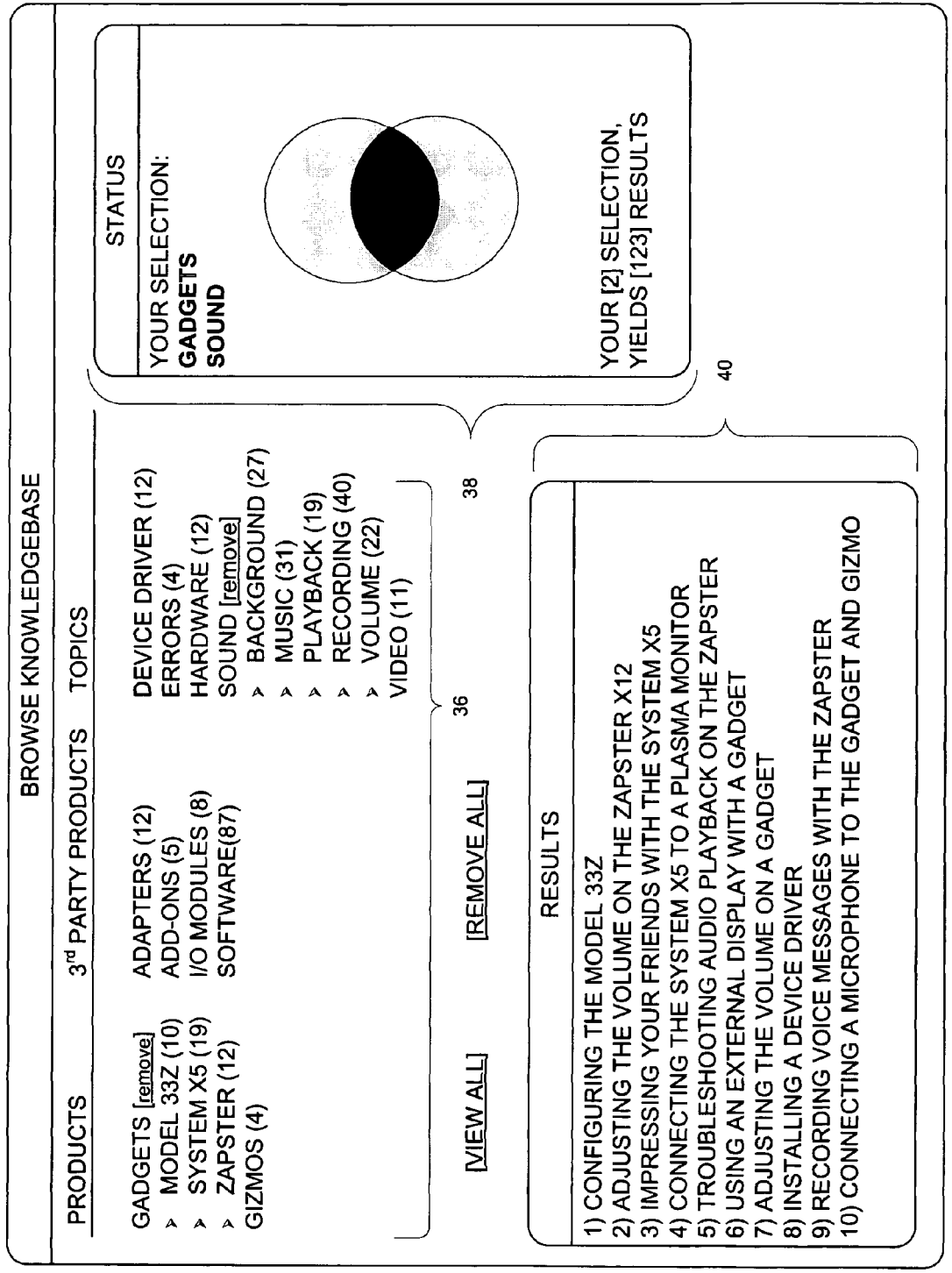

FIG. 6 illustrates the user interface 14 after the user has made a second category selection. For example, as illustrated in FIG. 6, the user has selected the category, SOUND, under the master category, TOPICS. Accordingly, the sub-categories for the SOUND category are displayed. In addition, the categories are dynamically updated based on the user's category selection. In this case, the category DATABASE has been removed from the hierarchical category display because there are no documents under the category DATABASE that satisfy the query associated with the category DATABASE, and the queries associated with the user's other category selections (e.g., GADGETS and SOUND). Note that once again the total number of documents associated with each query is updated based on the user's category selection. For example, the number of documents in the MODEL 33Z category went from "(101)" to "(10)" based on the user's selection of the category SOUND. This indicates that there are ten documents that satisfy the queries for both SOUND and GADGETS.

For one embodiment of the invention, the visual display indicator 38 is updated to reflect the user's selection of the category SOUND. For example, as illustrated in FIG. 6, the Venn diagram has been updated to show the intersection of the two sets of documents corresponding to the user's two category selections.

Figure 7:
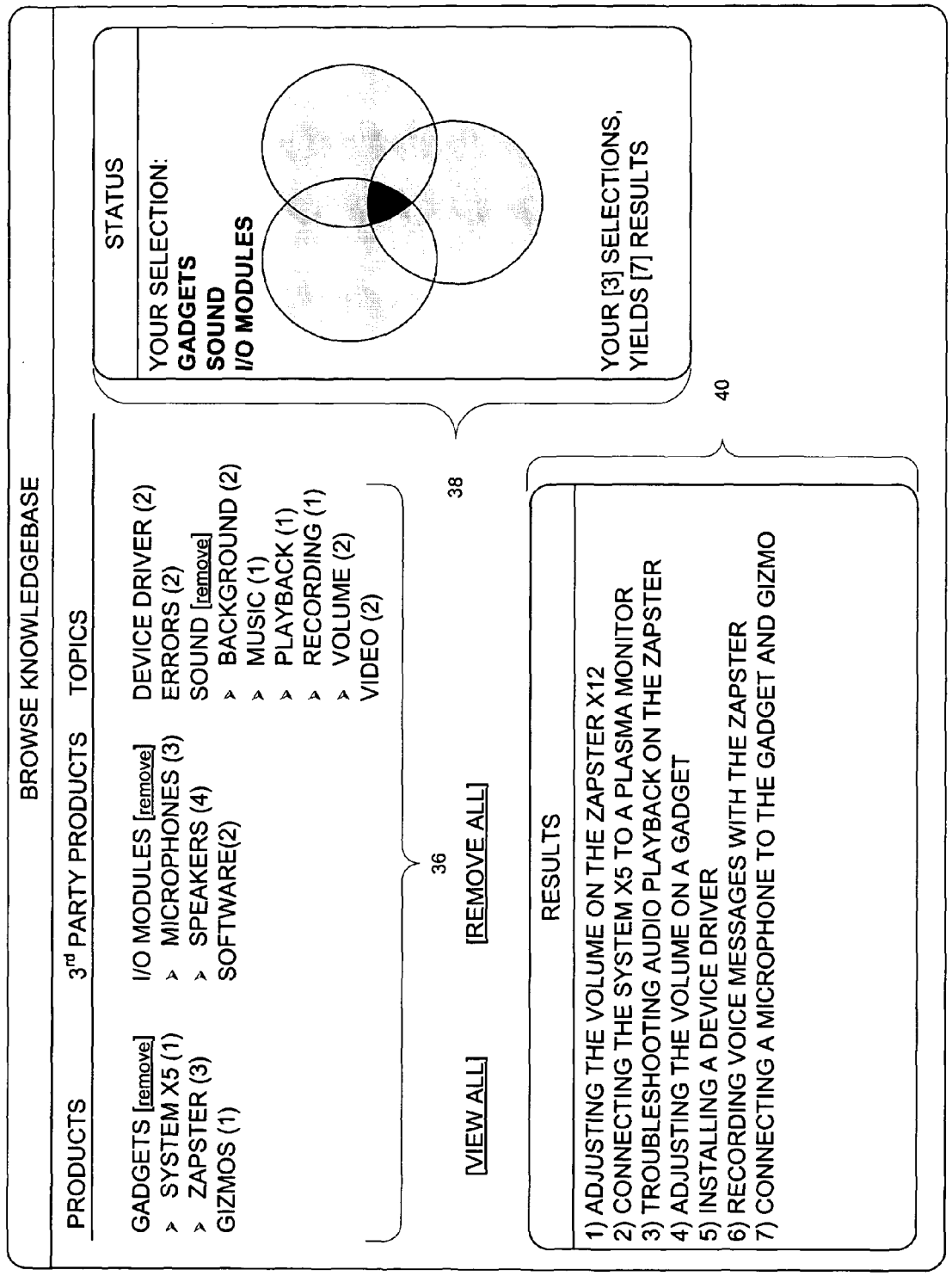

FIG. 7 illustrates the user interface 14 after a user has made a third category selection. For example, in FIG. 7, the user has selected the category I/O MODULES. Accordingly, sub-categories for I/O MODULES are displayed and the categories and number of documents associated with each category are dynamically updated. Note that several categories have been removed from the hierarchical category display 36 because there are no longer any documents associated with those categories that satisfy all of the user's category selections. For one embodiment of the invention, after a user has selected a particular category, the user can deselect the category by selecting a "[remove]" button or link that is situated next to the selected category. In addition, the user may select a "[REMOVE ALL]" button or link to quickly remove all previously made category selections.

Figure 8:
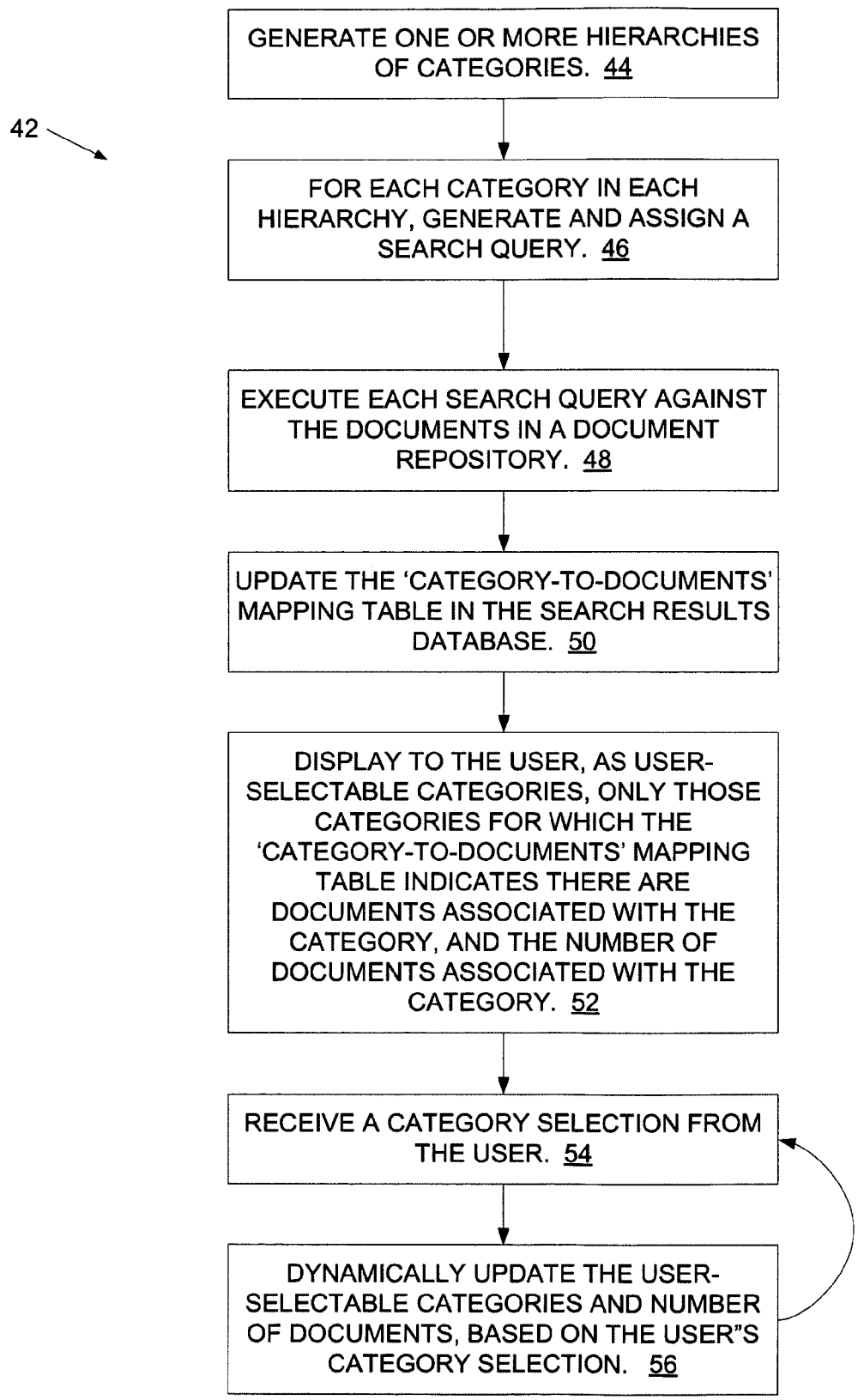
FIG. 8 illustrates a method, according to one embodiment of the invention, for facilitating browsing documents in a document repository; and, FIG. 9 shows a diagrammatic representation of a machine in the form of a computer system within which a set of instructions, for causing the machine to perform any one or more of the methodologies discussed herein, may be executed.

FIG. 8 illustrates a method, according to one embodiment of the invention, for facilitating browsing documents in a document repository. At operation 44, one or more hierarchies of categories are generated. For one embodiment of the invention, the hierarchies may include one or more levels of sub-categories. In addition, the hierarchies may be further categorized into master categories.

At operation 46, a search query is generated for, and assigned to, each category in each hierarchy. The search query may include a search string, and the search string may be based on the category name. For one embodiment of the invention, an automatic search query builder 24 generates each search query. The search query builder 24 may use a linguistic database to expand the particular search string to include other word forms, based on the category name. For one embodiment of the invention, for certain high-level categories, the search query includes one or more document properties to search. For example, the search query may be generated to search for a string match in one particular part of the document, such as the title, or a product field.

Next, at operation 48, each search query is executed against the documents in a document repository 16. Based on the results of each search query, at operation 50, a category-to-document mapping table is updated to indicate the documents that are associated with each category.

At operation 52, the user is presented with a user interface displaying the hierarchical categories that have associated documents. In addition, for one embodiment of the invention, the number of documents associated with each category may be displayed along with the category. Because the categories that are displayed to the user are selected based on the category-to-documents mapping table, the possibility that a category with no associated documents is displayed to the user is eliminated.

At operation 54, via the user interface 14, a category selection is received from the user. Based on the user's category selection, the hierarchical categories displayed to the user are dynamically updated at operation 56. For one embodiment, sub-categories for the selected category are displayed to the user. In addition, categories that do not have documents that satisfy the user's category selection may be removed, and not displayed to the user. For one embodiment of the invention, the number of documents associated with each category and the user's selected category are updated based on the user's category selection. Furthermore, a visual indicator of the set of documents that satisfy the search queries associated with the user's category selection may be displayed and updated each time a user selects a category. For one embodiment of the invention, the user may select several categories, and for each category selection, the display of hierarchical categories is dynamically updated to reflect the results of the user's category selection.

Figure 9:
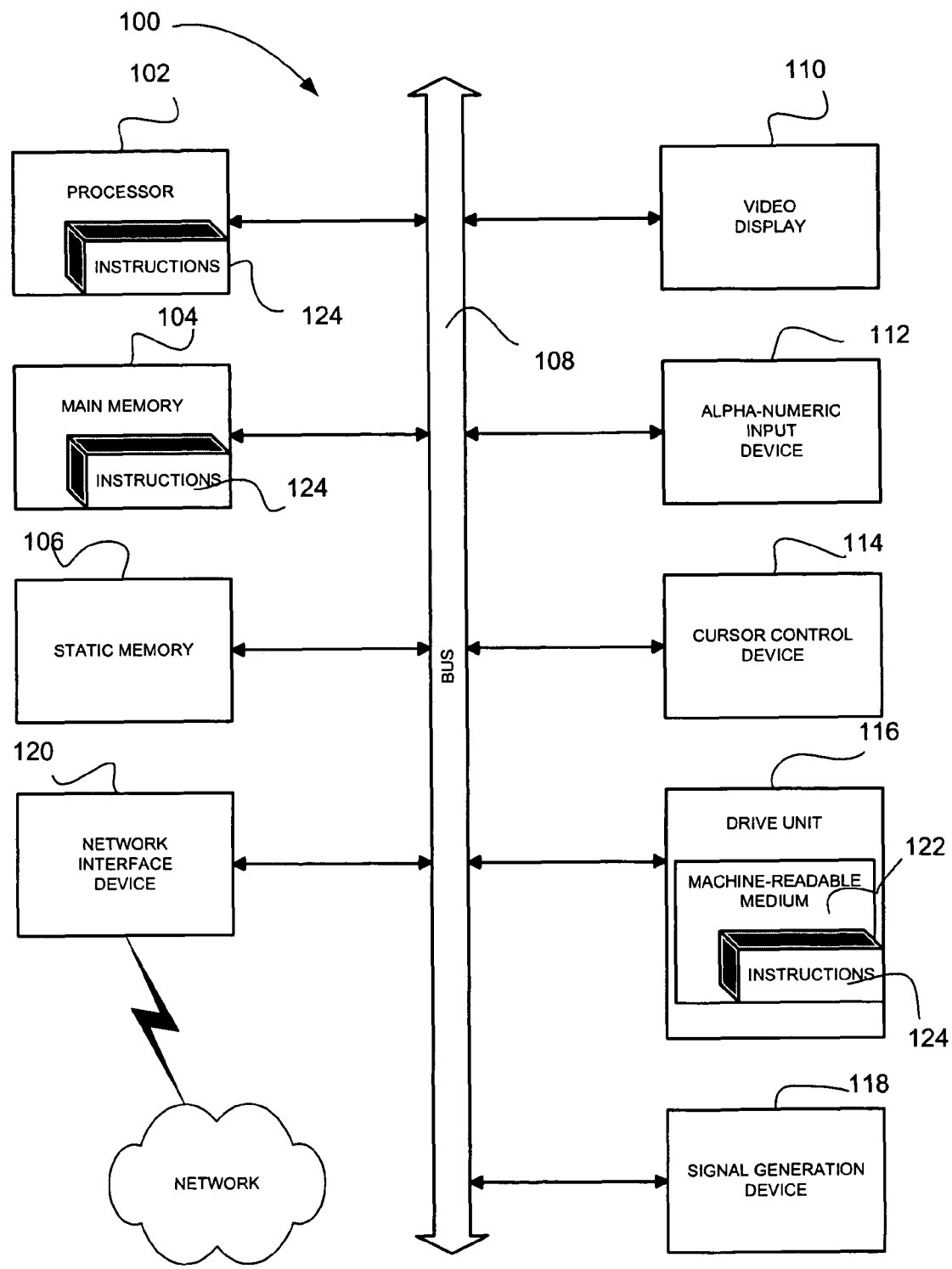

FIG. 9 shows a diagrammatic representation of a machine in the form of a computer system 100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer, or distributed, network environment. The machine may be a server computer, a client computer, a PC, a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The computer system 100 includes a processor 102 (e.g., a central processing unit (CPU) a graphics processing unit (GPU) or both), a main memory 104 and a static memory 106, which communicate with each other via a bus 108. The computer system 100 may further include a video display unit 110 (e.g., a liquid crystal display (LCD) or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker) and a network interface device 120.

The disk drive unit 116 includes a machine-readable medium 122 on which is stored one or more sets of instructions (e.g., software 124) embodying any one or more of the methodologies or functions described herein. The software 124 may also reside, completely or at least partially, within the main memory 104 and/or within the processor 102 during execution thereof by the computer system 100, the main memory 104 and the processor 102 also constituting machine-readable media. The software 124 may further be transmitted or received over a network 126 via the network interface device 120.

While the machine-readable medium 192 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system for browsing a document repository are provided with reference to specific exemplary embodiments. It will be evident that various modifications and changes may be made to theses embodiments without departing from the broader spirit and scope of the invention. Accordingly, the specification and drawings are to be regarded in an illustrative rather than a restrictive sense.

What is claimed is:

1. A machine implemented method to facilitate document browsing, the method comprising:
    presenting a user interface to a user, the user interface displaying a hierarchy of user-selectable categories, wherein the hierarchy comprises a plurality of top-level categories, each top-level category having an associated search query; and
    in response to a top-level category selection by a user, dynamically updating, by a computer having a processor, the hierarchy of user-selectable categories to display a sub-category of the user-selected top-level category and to further display a different top-level category for which a document in a document repository matches the search query of the different top-level category and matches the search query of the user-selected top-level category, wherein dynamically updating the hierarchy of user-selectable categories includes removing top-level categories and sub-categories for which, based on the user-selected top-level category, no documents are available, and wherein at least one document in the document repository matches the search queries of two or more categories in the hierarchy of categories.

2. The method of claim 1, wherein the search query associated with each category is executed against the document repository prior to presenting the user interface to the user, thereby eliminating the possibility that a category having no associated documents will be presented to the user.

3. A machine implemented method to facilitate document browsing, the method comprising:
    receiving administrator input defining a hierarchy of one or more user-selectable categories, wherein the hierarchy comprises a plurality of top-level categories;
    assigning a search query to each user-selectable category of the hierarchy;
    executing each search query against a document repository to update a search results database, wherein the search results database maps user-selectable categories to documents stored in the document repository based on the search query assigned to each user-selectable category;
    displaying, as user-selectable top-level categories, only those user-selectable categories for which the search results database indicates that the search query associated with the user-selectable category returned at least one document; and
    in response to a top-level category selection by a user, dynamically updating, by a computer having a processor, the hierarchy of user-selectable categories to display a sub-category of the user-selected top-level category and to further display a different top-level category for which a document in the document repository matches the search query of the different top-level category and matches the search query of the user-selected top-level category, wherein dynamically updating the hierarchy of user-selectable categories includes removing top-level categories and sub-categories for which, based on the user-selected top-level category, no documents are available, and wherein at least one document in the document repository matches the search queries of two or more user-selectable categories in the hierarchy of user-selectable categories.

4. The method of claim 3, wherein defining a hierarchy of one or more categories includes organizing the one or more categories into one or more hierarchies, each hierarchy having a top-level category and one or more sub-categories.

5. The method of claim 4, further comprising:
receiving at least one top-level category selection from a user;
for each user-selected top-level category, displaying, as user-selectable, the sub-categories of the top-level category; and
dynamically updating the user-selectable top-level categories and sub-categories that are displayed to the user based on each top-level category and sub-category selected by the user.

6. The method of claim 5, wherein the number of documents associated with the category is displayed along with the category.

7. The method of claim 6, wherein dynamically updating the user-selectable top-level categories and sub-categories that are displayed based on each category and sub-category selected by the user includes updating the number of documents associated with the category, based on each category and sub-category selected by the user.

8. The method of claim 4, further comprising:
responsive to a user selecting to expand the one or more hierarchies, expanding the one or more hierarchies to display the one or more categories within each hierarchy; and
responsive to a user selecting a sub-category, dynamically updating the user-selectable top-level categories and sub-categories that are displayed to the user, based on the selected sub-category.

9. A machine implemented method to facilitate document browsing, the method comprising:
receiving administrator input defining one or more hierarchies of categories, each hierarchy having a top-level category and at least one level of sub-categories;
for each hierarchy, assigning a search query to each category within the hierarchy, each search query including a search string;
for each category within a hierarchy, performing a search of documents based on the search query assigned to the category, the search to identify documents that have content that matches the search string associated with the search query of the category;
updating a search results database based on the search query of each category;
presenting to a user the top-level category for each hierarchy, when the search results database indicates that the search string, associated with each top-level category, matched content in at least one document; and
in response to a top-level category selection by a user, dynamically updating, by a computer having a processor, the hierarchy of categories associated with the user-selected top-level category to display a sub-category of the user-selected top-level category and to further display a different top-level category for which a document in a document repository matches a search string associated with the search query of the different top-level category and matches the search string associated with a search query of the user-selected top-level category, wherein dynamically updating the hierarchy of user-selectable categories includes removing top-level categories and sub-categories for which, based on the user-selected top-level category, no documents are available, and wherein at least one document in the document repository matches the search string associated with the search queries of two or more categories in the hierarchy of categories.

10. The method of claim 9, further comprising:
responsive to a user selecting a top-level category, presenting to the user each sub-category associated with the selected top-level category.

11. The method of claim 9, wherein at least one of the search queries assigned to a category specifies a document property to search for the search string associated with the search query.

12. The method of claim 9, wherein at least one of the search queries assigned to a top-level category specifies a document property to search for the search string associated with the search query.

13. The method of claim 9 wherein updating a search results database based on the search query of each category includes executing each search query assigned to a category against a document repository at a regular interval.

14. A document browsing system, comprising:
a document repository to store documents;
an electronically stored file containing one or more hierarchies of categories, wherein each hierarchy of categories comprises a top-level category;
a search results database to map documents in the document repository to the categories;
a search engine to assign a search query to each category within the one or more hierarchies, and to update the search results database by executing each search query against the documents in the document repository; and
a user interface to display user-selectable categories for each hierarchy, the user-selectable categories dynamically updated based on a top-level category selection by a user, to display a sub-category of the user-selected top-level category and to further display a different top-level category for which a document in the document repository matches the search query of the different top-level category and matches the search query of the user-selected top-level category, wherein when the user-selectable categories are dynamically updated, top-level categories and sub-categories are removed for which, based on the user-selected top-level category, no documents are available, and wherein at least one document in the document repository matches the search queries of two or more categories in the hierarchy of categories.

15. The document browsing system of claim 14, wherein the user interface displays the user-selectable categories to a user after the search engine has updated the search results database by executing each search query against the documents in the document repository, thereby eliminating the possibility that a category having no associated documents will be presented to the user.

16. The document browsing system of claim 14, wherein each hierarchy within the hierarchies of categories, includes a top-level category and one or more sub-categories.

17. The document browsing system of claim 14, wherein the user interface is to receive one or more category selections from the user.

18. The document browsing system of claim 17, wherein, in addition to displaying user-selectable categories for each hierarchy, the user interface is to display the number of documents associated with each particular category.

19. The document browsing system of claim 17, wherein the user interface dynamically updates the number of documents associated with each particular category, based on the categories selected by the user.

20. The document browsing system of claim 19, wherein the user interface includes a visual depiction of the set of documents that satisfy the search queries associated with each category selected by the user.

21. The document browsing system of claim 20, wherein the visual depiction is a Venn diagram.

22. A document browsing system, comprising:
means for storing documents, the means for storing comprising a mass storage device;
means for defining one or more hierarchies of categories, wherein each hierarchy comprises a top-level category;
means for mapping documents to categories;
means for assigning a search query to each category within a hierarchy;
means for updating the means for mapping documents to categories by executing each search query against the documents; and
means for displaying user-selectable top-level categories for each hierarchy, the user-selectable categories dynamically updated based on each top-level category selected by a user, to display a sub-category of the user-selected top-level category and to further display a different top-level category for which a document in a document repository matches the search query of the different top-level category mad matches the search query of the user-selected category, wherein dynamically updating the hierarchy of user-selectable categories includes removing top-level categories and sub-categories for which, based on the user-selected top-level category, no documents are available, and wherein at least one document in the document repository matches the search queries of two or more categories in the hierarchy of categories.

23. The document browsing system of claim 22, wherein each hierarchy within the hierarchies of categories, includes a top-level category and one or more sub-categories.

24. The document browsing system of claim 22, wherein the means for displaying user-selectable categories for each hierarchy includes means for receiving one or more category selections from the user.

25. The document browsing system of claim 24, wherein, in addition to displaying user-selectable categories for each hierarchy, the means for displaying user-selectable categories for each hierarchy includes means for displaying the number of documents associated with each particular category.

26. The document browsing system of claim 24, wherein the means for displaying user-selectable categories for each hierarchy includes means for dynamically updating the number of documents associated with each particular category, based on one or more categories selected by the user.

27. The document browsing system of claim 26, wherein the means for displaying user-selectable categories for each hierarchy includes a visual depiction of the set of documents that satisfy the search queries associated with each category selected by the user.

28. The document browsing system of claim 27, wherein the visual depiction is a Venn diagram.

29. A machine-readable storage medium embodying a sequence of instructions for facilitating document browsing, the instructions, when executed by a machine, cause the machine to:
receive administrator input defining a hierarchy of one or more user-selectable categories, wherein the hierarchy of user-selectable categories comprises a plurality of top-level categories;
assign a search query to each user-selectable category of the hierarchy;
execute each search query against a document repository to update a search results database, wherein the search results database maps user-selectable categories to documents stored in the document repository based on the search query assigned to each user-selectable category;
display, as user-selectable categories, only those user-selectable categories for which the search results database indicates that the search query associated with the user-selectable category returned at least one document; and
in response to a top-level category selection by a user, dynamically update the hierarchy of user-selectable categories to display a sub-category of the user-selected top-level category and to further display a different top-level category for which a document in the document repository matches the search query of the different top-level category and of the user-selected top-level category, wherein dynamically updating the hierarchy of user-selectable categories includes removing top-level categories and sub-categories for which, based on the user-selected top-level category, no documents are available, and wherein at least one document in the document repository matches the search queries of two or more user-selectable categories in the hierarchy of user-selectable categories.

30. The machine-readable storage medium of claim 29, wherein generating one or more categories includes organizing the one or more categories into one or more hierarchies, each hierarchy having a top-level category and one or more sub-categories.

31. The machine-readable storage medium of claim 30, wherein the instructions further cause the machine to:
receive at least one top-level category selection from a user;
for each user-selected top-level category, display, as user-selectable, the sub-categories of the top-level category; and
dynamically update the user-selectable top-level categories and sub-categories that are displayed to the user based on each top-level category and sub-category selected by the user.

32. The machine-readable storage medium of claim 31, wherein the number of documents associated with the category is displayed along with the category.

33. The machine-readable storage medium of claim 32, wherein dynamically updating the user-selectable top-level categories and sub-categories that are displayed based on each category and sub-category selected by the user includes updating the number of documents associated with the category, based on each category and sub-category selected by the user.

34. The machine-readable storage medium of claim 31, wherein the instructions further cause the machine to:
expand the one or more hierarchies to display the one or more categories within each hierarchy in response to a user selecting to expand the one or more hierarchies; and
dynamically update the user-selectable top-level categories and sub-categories that are displayed to the user in response to a user selecting a top-level category or sub-category.

35. A machine implemented method, comprising:
presenting a user interface to a user, the user interface displaying a hierarchy of user-selectable categories each having an associated search query, wherein the hierarchy comprises a plurality of top-level categories, and wherein at least one document in a document repository is associated with each displayed user-selectable category;

receiving a top-level category selection; and in response to the top-level category selection, dynamically updating, by a computer having a processor, the hierarchy of user-selectable categories to display a subcategory of the user-selected top-level category and to further display a different top-level category for which a document in the document repository matches the search query of the different top-level category and of the user-selected top-level category, wherein dynamically updating the hierarchy of user-selectable categories includes removing top-level categories and subcategories for which, based on the user-selected top-level category, no documents are available.

* * * * *